United States Patent
Obika et al.

(10) Patent No.: US 8,092,951 B2
(45) Date of Patent: Jan. 10, 2012

(54) FUEL CELL, FUEL CELL STACK AND METHOD OF MANUFACTURING THE SAME

(75) Inventors: Motoharu Obika, Yokohama (JP); Atsushi Miyazawa, Kamakura (JP); Nobuo Kino, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 627 days.

(21) Appl. No.: 12/294,072

(22) PCT Filed: May 15, 2007

(86) PCT No.: PCT/IB2007/001254
§ 371 (c)(1),
(2), (4) Date: Sep. 23, 2008

(87) PCT Pub. No.: WO2007/135507
PCT Pub. Date: Nov. 29, 2007

(65) Prior Publication Data
US 2009/0117431 A1    May 7, 2009

(30) Foreign Application Priority Data
May 16, 2006   (JP) ................................. 2006-136793

(51) Int. Cl.
*H01M 2/38* (2006.01)
(52) U.S. Cl. ........................................ 429/460; 429/535
(58) Field of Classification Search ........................ None
See application file for complete search history.

(56) References Cited

U.S. PATENT DOCUMENTS

| | | | |
|---|---|---|---|
| 7,341,799 B2 * | 3/2008 | Hashimoto et al. | 429/492 |
| 7,560,187 B2 * | 7/2009 | Inagaki | 429/483 |
| 7,767,355 B2 * | 8/2010 | Kato et al. | 429/456 |
| 7,776,464 B2 * | 8/2010 | Kohyama et al. | 429/460 |
| 7,977,011 B2 * | 7/2011 | Inagaki | 429/509 |
| 7,981,562 B2 * | 7/2011 | Lee | 429/468 |
| 2003/0152819 A1 * | 8/2003 | Hatoh et al. | 429/32 |
| 2003/0152821 A1 | 8/2003 | Lisi et al. | |
| 2004/0028581 A1 * | 2/2004 | Edlund et al. | 422/211 |
| 2004/0131905 A1 | 7/2004 | Enjoji et al. | |
| 2005/0106446 A1 * | 5/2005 | Sato et al. | 429/38 |
| 2005/0158603 A1 | 7/2005 | Murphy et al. | |

FOREIGN PATENT DOCUMENTS

| | | |
|---|---|---|
| JP | 2004-127699 | 4/2004 |
| JP | 2005-002411 | 1/2005 |
| JP | 2005-190968 | 7/2005 |
| JP | 2005-276807 | 10/2005 |
| JP | 2005-317479 | 11/2005 |
| WO | WO 2006/043729 | 4/2006 |

\* cited by examiner

*Primary Examiner* — Thanh Tam Le
(74) *Attorney, Agent, or Firm* — Drinker Biddle & Reath LLP

(57) ABSTRACT

A fuel cell stack and method of manufacturing a fuel cell stack having a highly anti-corrosive property. The fuel cell stack includes a plurality of cells constructed by interposing an electrolyte membrane electrode assembly between the first and second separators. The first and second separators define gas passages on from both sides of the electrolyte membrane electrode assembly, and a gas manifold is in fluid communication with the gas flow passages through the plurality of stacked cells. Manifold openings for defining the gas manifold are formed in the first and second separators, and the opening areas of the manifold openings are differently sized. The manifold opening inner peripheral end of the first separator has a larger opening area, and is welded to the second separator to form a manifold welding portion.

14 Claims, 9 Drawing Sheets

(a)

(b)

(c)

(a)

(b)

(c)

FUEL CELL, FUEL CELL STACK AND METHOD OF MANUFACTURING THE SAME

CROSS-REFERENCE TO RELATED APPLICATIONS

This application claims priority to Japanese Patent Application No. 2006-136793, filed May 16, 2006, the disclosure of which is incorporated by reference herein in its entirety.

BACKGROUND OF THE INVENTION

1. Field of the Invention

The present invention relates to a fuel cell, a fuel cell stack and a method of manufacturing the same, which are suitable for constructing a separator with a metal plate. In particular, the present invention is directed to a fuel cell stack and a method of manufacturing the same for a fuel cell mounted in a vehicle.

2. Description of Related Art

A solid polymer type fuel cell includes a solid polymer electrolyte membrane having proton conductivity. Such a fuel cell is configured to supply a fuel gas to an anode of a pair of electrodes, wherein the electrolyte membrane is interposed between such electrodes. The fuel cell is also configured to supply an oxidizer gas to a cathode and generates an electric power using an electrochemical reaction occurring on a surface of the electrolyte membrane.

A single cell includes an electrolyte membrane electrode assembly (MEA) formed by interposing the electrolyte membrane between a pair of electrode catalytic layers. The cell further includes a separator for defining a gas flow passage at both sides of the electrolyte membrane electrode assembly.

The separator defines a gas flow passage for distributing a fuel gas or an oxidizer gas. It also defines a temperature control medium flow passage for distributing a temperature control medium.

Further, the separator is made from a conductive material in order to serve as a conductive path and for extracting an output from the electrode catalytic layers of each cell.

In a related device, a carbon separator having both corrosion resistance and conductivity is generally used for a fuel cell. However, in another related device, a metallic separator has been provided in order to reduce the cost of the product while improving the power density by thinning the separator.

Japanese Laid-Open Patent Publication No. 2004-127699 includes an example of a fuel cell with a metallic separator, which is configured as two separators welded together to defines a gas manifold that passes through the cell.

BRIEF SUMMARY OF THE INVENTION

However, in this configuration, the gas manifold is defined at the welded ends of metallic separator. Accordingly, a gap may be formed between open ends of the welded separators.

Thus, there is a need to address the deficiencies of related devices and to provide a fuel cell stack, a fuel cell separator and a method of manufacturing the same.

In accordance with an aspect of an exemplary embodiment of a fuel cell system, there is provided an electrolyte membrane electrode assembly having electrode catalytic layers at both sides of the electrode membrane, a first metallic separator having a first manifold opening for defining a gas manifold at one side of the electrolyte membrane electrode assembly, wherein the gas manifold serves to distribute a gas in the stacked direction, a second metallic separator having a second manifold opening at another side of the electrolyte membrane electrode assembly, wherein the second manifold opening has an opening smaller than that of the first manifold opening and communicates with the first manifold opening, and a manifold welding portion, wherein an inner peripheral end of the first manifold is welded to the second separator at the manifold welding portion.

In accordance with another aspect of an exemplary embodiment of a fuel cell manufacturing method, a first manifold opening is formed in a first metallic separator disposed at one side of an electrolyte membrane electrode assembly having electrode catalytic layers at both sides of the electrolyte membrane, wherein the first manifold opening defines a gas manifold for distributing a gas in a stacked direction; a second manifold opening is formed in a second metallic separator disposed at another side of the electrolyte membrane electrode assembly, wherein the second manifold opening has an opening smaller than that of the first manifold opening and communicates with the first manifold opening; and an inner peripheral end of the first manifold is welded to the second separator.

In accordance with an aspect of an embodiment of a fuel cell system, a manifold welded portion is formed by welding at the inner peripheral end of the manifold opening of the first separator that has a larger opening than that of the second separator. Accordingly, a gap is not formed at a portion located closer to the manifold opening than the manifold welding portion of the first and second separators. Consequently, corrosion at the welded portion can be prevented.

In accordance with a further aspect of an exemplary embodiment of a fuel cell, there is provided an electrolyte membrane electrode assembly, a metallic first separator, and a metallic second separator. The electrolyte membrane electrode assembly includes first and second electrode catalytic layers that are disposed on respective first and second sides of an electrolyte membrane. The first separator is contiguously disposed with the first electrode catalytic layer, and includes a first manifold opening through which a fluid flows. The second separator is contiguously disposed with the second electrode catalytic layer, and includes a second manifold opening through which the fluid flows. The second manifold opening has an opening area smaller than that of the first manifold opening.

In accordance with yet a further aspect of an exemplary embodiment of a fuel cell stack, there is provided a first fuel cell, a second fuel cell, and a separator assembly that is disposed between the first and second fuel cells. The first fuel cell includes a first electrolyte membrane electrode assembly, which includes a first anode catalytic layer, a first cathode catalytic layer, and a first electrode membrane that is disposed between the first anode and first cathode catalytic layers. The second fuel cell includes a second electrolyte membrane electrode assembly, which includes a second anode catalytic layer, a second cathode catalytic layer, and a second electrode membrane that is disposed between the second anode and second cathode catalytic layers. The separator assembly includes metallic first and second separators, and a manifold welding portion fixing together the first and second separators. The first separator includes a first gas flow passage that supplies an anode gas to the first anode catalytic layer and also includes a first manifold opening of a gas manifold. The second separator includes a second gas flow passage that supplies a cathode gas to the second cathode catalytic layer and also includes a second manifold opening of the gas manifold. The second manifold opening is differently sized with respect to the first manifold opening. The manifold welding portion is disposed at a peripheral edge of a larger of the first and second manifold openings and is also disposed surrounding and spaced from a peripheral edge of a smaller of the first and second manifold openings.

BRIEF DESCRIPTION OF THE DRAWINGS

The accompanying drawings, which are incorporated herein and constitute part of this specification, illustrate aspects of exemplary embodiments of the invention, and together with the general description given above and the detailed description given below, serve to explain features of the invention.

DETAILED DESCRIPTION OF THE PREFERRED EMBODIMENTS

Figure 1:
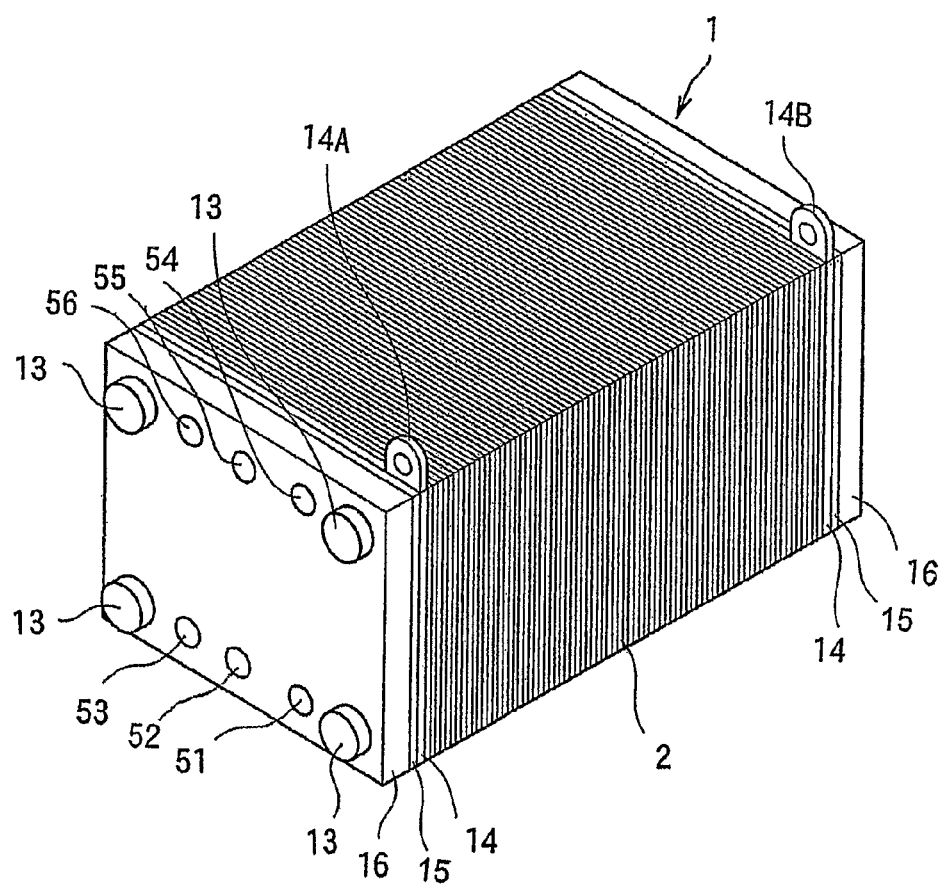
FIG. 1 is a perspective view of a fuel cell stack constructed in accordance with a exemplary embodiment of the present invention.
Figure 2:
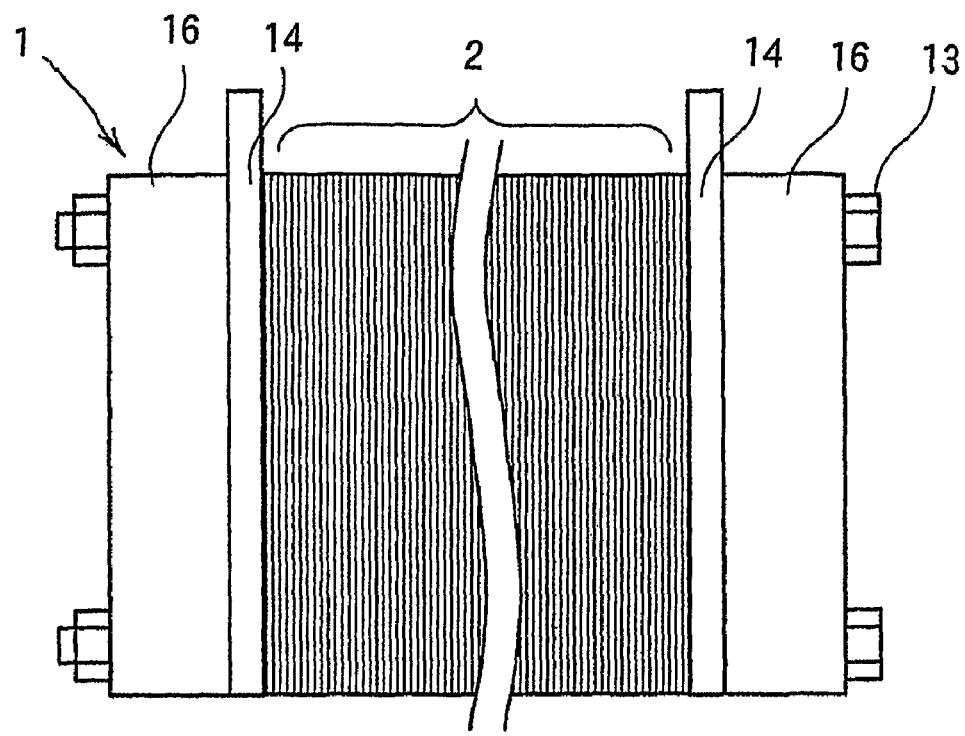
FIG. 2 is a plan view of a fuel cell stack constructed in accordance with the exemplary embodiment illustrated in FIG. 1.

FIG. 1 is a perspective view of the fuel cell stack constructed in general accordance with the present invention. FIG. 2 is a plan view of the fuel cell stack shown in FIG. 1. As shown in FIGS. 1 and 2, a plurality of cells 2 are stacked in series in the fuel cell stack 1. Further, disposed at both ends along the stacked direction are a current collecting plate 14, an insulating plate 15 and an end plate 16. A fastening load can be applied along the stacked direction of each cell 2 by pulling together the end plates 16, e.g., with a plurality of tie rods 13.

In the fuel cell stack 1 of a fuel cell mounted in a vehicle (not shown), three to four hundred cells 2 may be stacked in series, for example. An electromotive force generated in the fuel stack 1 can be extracted via respective output terminals 14A and 14B of the current collecting plates 14.

Openings in at least one end plate 16 may include a cathode gas inlet 51, a temperature control medium inlet 52, an anode gas inlet 53, a cathode gas outlet 54, a temperature control medium outlet 55 and an anode gas outlet 56. Further, pipes (not shown) may be connected to these openings.

Figure 3:
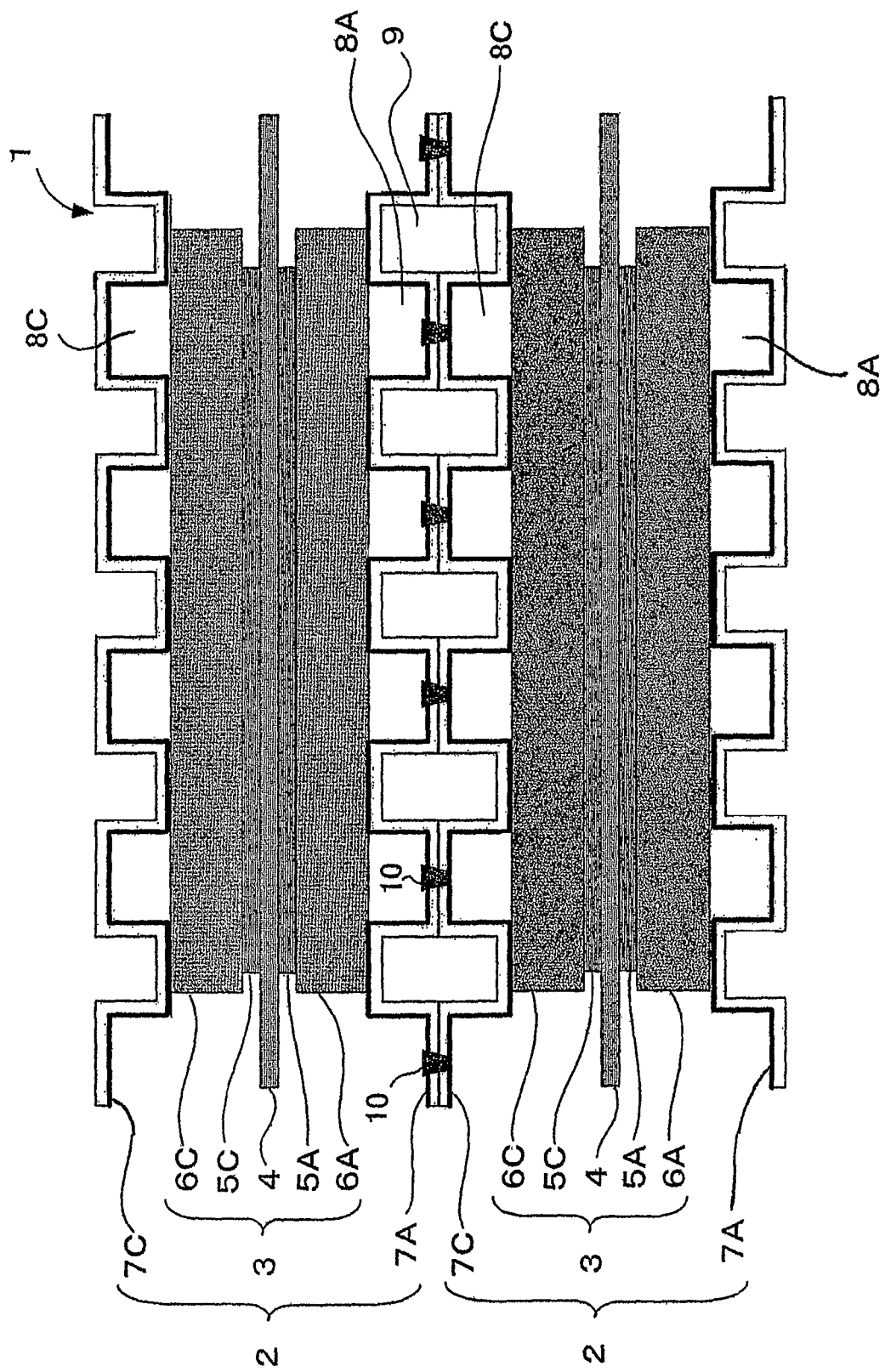
FIG. 3 is a cross-sectional view of a fuel cell stack constructed in accordance with the exemplary embodiment illustrated in FIG. 1.

As shown in FIG. 3, each of the cells 2 (two are illustrated) may be formed as an unitary unit including an electrolyte membrane electrode assembly (MEA) 3. The electrolyte membrane electrode assembly 3 may be constructed by interposing an electrode membrane 4 between a pair of electrode catalytic layers 5A and 5C. Each cell 2 also includes first and second separators 7A and 7C that define gas passages 8A and 8C at respective sides of the electrolyte membrane electrode assembly 3.

The electrolyte membrane electrode assembly 3 may include a solid polymer electrolyte membrane 4 providing proton conductivity. Such an electrode assembly 3 is constructed by arranging the electrode catalytic layers 5A and 5C of each electrode at both sides of a reaction area of the electrolyte membrane 4 and disposing gas diffusion layers 6A and 6C sandwiching the electrode catalytic layers 5A and 5C. The electrode catalytic layers 5A and 5C may be formed, for example, from platinum or an alloy of platinum and other metals. The gas diffusion layers 6A and 6C may be formed, for example, from materials providing gas diffusivity and conductivity such as carbon cloth, carbon paper or carbon felt, etc.

In a fuel cell, a fuel gas is supplied to an anode and an oxidizer gas is supplied to a cathode, wherein the electrolyte membrane 4 is interposed between the anode and the cathode. Formulas (1) and (2) describe examples of reactions that may be performed on the respective surfaces of the electrolyte membrane 4 to thereby generate electric power:

$$\text{Anodic reaction: } H_2 \rightarrow 2H^+ + 2e^- \tag{1}$$

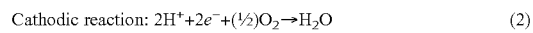

$$\text{Cathodic reaction: } 2H^+ + 2e^- + (\tfrac{1}{2})O_2 \rightarrow H_2O \tag{2}$$

A gasket may be arranged in a circumferential area surrounding a reaction area of the electrolyte membrane 4 and on both sides of the electrolyte membrane electrode assembly 3. Thus, the electrolyte membrane electrode assembly 3 is interposed between the first and second separators 7A and 7C via the gaskets.

The gasket may be formed from, for example, rubber elastic materials such as silicon rubber, ethylene propylene diene monomer rubber (EPDM rubber), or fluoric rubber. Alternatively, the gasket may be integrated with the first and second separators 7A and 7C, or be provided by a thin plate material having a large elastic modulus. Such a thin plate may include, for example, polycarbonate or polyethyleneterephthalate, and which may be adhered to the electrolyte membrane electrode assembly 3 by, for example, a thermosetting fluorine-based or thermosetting silicone liquid seal.

Gas flow passages 8A for guiding an anode gas are disposed between the first separator 7A and the gas diffusing layer 6A. An anode gas (e.g., hydrogen gas) is introduced from the anode gas inlet 53 into the gas flow passages 8A via an inlet manifold (not shown in FIG. 3). Thus, the gas flow passages 8A supply the anode gas to each gas diffusion layer 6A. Then, any gas that is not consumed as part of the anodic reaction may be discharged, via an outlet manifold (not shown in FIG. 3), to the anode gas outlet 56.

Gas flow passages 8C for guiding a cathode gas are disposed between the second separator 7C and the gas diffusing layer 6C. A cathode gas (e.g., air) is introduced from the cathode gas inlet 51 into the gas flow passages 8C via the inlet manifold (not shown in FIG. 3). Thus, the gas flow passages 8C supply the cathode gas to the gas diffusion layer 6C. Then, any gas that is not consumed as part of the cathodic reaction may be discharged, via the outlet manifold (not shown in FIG. 3), to the cathode gas outlet 54.

Temperature control medium flow passages 9 for distributing a temperature control medium are disposed between the first and second separators 7A and 7C. A temperature control medium (e.g., a coolant) is introduced from the temperature control medium inlet 52 into the temperature control medium flow passages 9 via the inlet manifold (not shown in FIG. 3) and is discharged via the outlet manifold (not shown in FIG. 3) to the temperature control medium outlet 55. The temperature control medium absorbs the reaction heat via the first and second separators 7A and 7C, thereby providing cooling to the fuel cell stack 1.

Further, a gasket (not shown in FIG. 3) may be interposed between the first and second separators 7A and 7C to prevent leakage of the temperature control medium.

Also, it is preferred that the temperature control medium has a high electric resistance. It is also preferred that, for a fuel cell mounted in a vehicle, the temperature control medium includes an anti-freezing solution, i.e., so that it does not freeze even in cold environments.

In consideration of the environments in which the fuel cell operates and the conditions within the fuel cell, a metal material suitable for the first and second separators 7A and 7C may be, for example, SUS316L stainless steel plates.

Alternatively, the substrates of the first and second separators 7A and 7C may include other stainless steels that primarily contain at least one of Fe, Ni or Cr, or the substrates may be another material that contains Al, Ti, Cu, Zn, Mg, Mn, Pb, Au, Ag, Pt, Pd, Ru, W, Ni, Cr, Sn, Fe, or an alloy thereof.

The first and second separators 7A and 7C may be manufactured by press-forming a metal plate using a mold having the shape of a flow passage, etc. formed therein. The thickness of the metal plate may be, for example, approximately 0.1 to 1.0 millimeters (mm).

Figure 4:
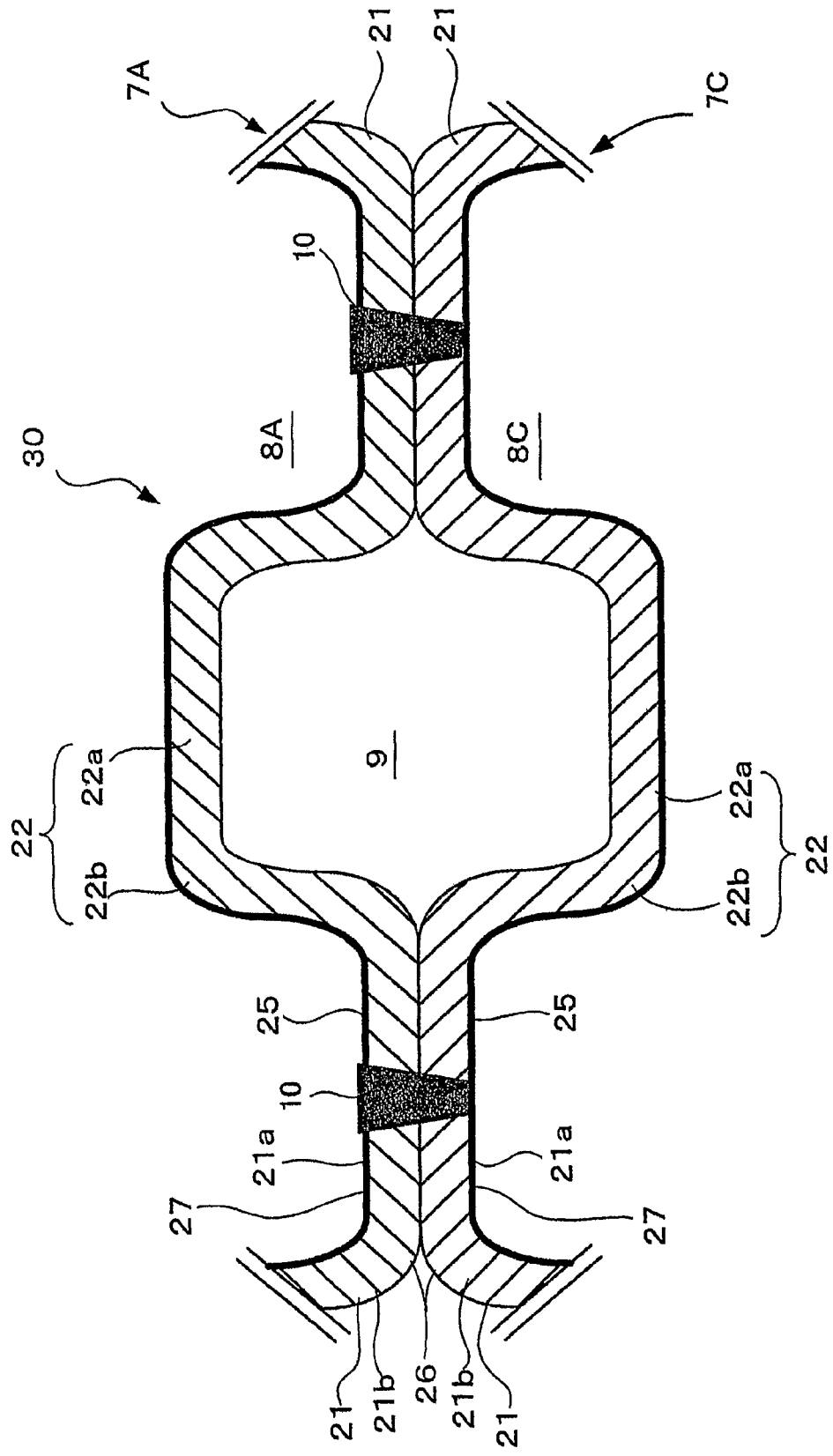
FIG. 4 is a cross-sectional view of first and second separators constructed in accordance with the exemplary embodiment illustrated in FIG. 1.

FIG. 4 is a cross-sectional view of a separator assembly 30 formed by joining together the first and second separators 7A and 7C of respective directly adjacent cells 2. The first and second separators 7A and 7C may be formed, for example, in a corrugated plate shape. In particular, the corrugated plates may be formed alternately arranging ridges 21, which are to be connected to corresponding separators 7A and 7C of directly adjacent cells 2, and ridges 22, which are to be disposed adjacent to the respective gas diffusing layers 6A and 6C. Accordingly, the ridges 21 define grooves between the ridges 22, and vice-versa. The width of the gas flow passages 8A and 8C, which is defined by the width of the ridges 21, and the width of the temperature control medium flow passages 9, which is defined by the width of the ridges 22, may be, for example, approximately 0.1 to 5.0 millimeters.

Each of the first and second separators 7A and 7C have a reaction side surface 25 that faces the electrolyte membrane electrode assembly 3, and a rear surface 26 that faces opposite to the reaction side surface 25. Each gas flow passage 8A and 8C is defined by each reaction side surface 25, whereas the temperature control medium flow passage 9 is defined by the rear surface 26.

The first and second separators 7A and 7C, which may have a stainless steel substrate, may also be configured such that an anti-corrosive coating layer 27 is disposed on the reaction side surfaces 25. The coating layer 27 may not be provided on the rear surfaces 26.

The anti-corrosive coating layer 27 disposed on the reaction side surface 25 may include, for example, Au and may have a plating layer thickness of approximately 5 micrometer ($\mu$m). The coating layer 27 provides protection against strong acidic conditions in the fuel cell 1, and particularly provides an anti-corrosive property in a sulfuric acid condition.

Alternatively, the anti-corrosive coating layer 27 disposed on the reaction side surface 25 may be provided by coatings that include Pt, Pd or Ti, or a surface reforming treatment may be provided to improve the anti-corrosive property.

Insofar as the anti-corrosive coating layer 27 may not be provided on the rear surfaces 26 of the first and second separators 7A and 7C, an oxide film surface layer may be disposed thereon. Respective rear surfaces 26 of the first and second separators 7A and 7C of directly adjacent cells 2 are joined together by a welding portion 10. The welding portion 10 may be formed on a reaction area, which is interposed between the electrode catalytic layers 5A and 5C.

The oxide film surface layer disposed on the rear surface 26 provides an insulation property. Although, the respective rear surfaces 26 of the first and second separators 7A and 7C of directly adjacent cells 2 are joined together by the welding portion 10, a contact electric resistance between the first and second separators 7A and 7C is not generated by the welding portion 10. Further, a penetrating electric resistance of the first and second separators 7A and 7C is reduced. Accordingly, the generating performance of the fuel cell 1 is thereby improved.

The ridges 21 and 22 may be formed by press-forming a metal plate such that ridge planar portions 21a and 22a may extend in generally parallel planes, and ridge edge portions 21b and 22b may bend in arcuate shapes at the ends of the ridge planar portions 21a and 22a.

The welding portion 10 connects together respective ridge planar portions 21a. Each ridge planar portion 21a becomes the bottom of a groove that defines the gas flow passages 8A and 8C.

Figure 5:
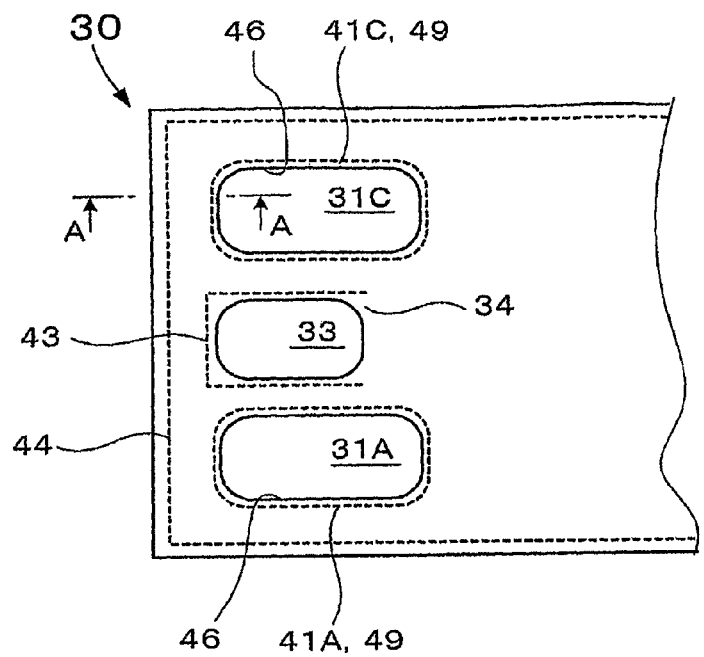
FIG. 5 is a plan view of a separator assembly constructed in accordance with the exemplary embodiment illustrated in FIG. 1.

FIG. 5 is a plan view of the separator assembly 30. At one end of the separator assembly 30, a temperature control medium manifold 33, an anode gas manifold 31A, and a cathode gas manifold 31C are configured to be opened. At another end of the separator assembly 30 (not shown in FIG. 5), the temperature control medium manifold and each gas manifold are also respectively configured to be opened so as to communicate with the temperature control medium outlet 55, the anode outlet 56 and the cathode gas outlet 54 of the end plate 16.

The temperature control medium manifold 33 is in fluid communication with the temperature control medium inlet 52 of the end plate 16. The temperature control medium manifold 33 distributes the temperature control medium. Thus, a temperature control medium is introduced from the temperature control medium inlet 52 to the temperature control medium flow passages 9 that are provided in each separator assembly 30.

In each separator assembly 30, a manifold welding portion 43 is provided so as to weld the first and second separators 7A and 7C around the temperature control medium manifold 33. As shown in FIG. 5, the manifold welding portion 43 extends around the temperature control medium manifold 33 in a generally rectangular three-sided shape. Further, an open side 34 in the shape of the welding portion 43 provides fluid communication for the temperature control medium manifold 33 with the temperature control medium flow passages 9 defined by the first and second separators 7A and 7C.

The anode gas manifold 31A is in fluid communication with the anode gas inlet 53 of the end plate 16. The gas manifold 31A distributes the anode gas. Thus, an anode gas is introduced from the anode gas inlet 53 to the gas flow passages 8A that are provided in each cell 2.

In each the separator assembly 30, a manifold welding portion 41A is provided so as to weld the first and second separators 7A and 7C around the anode gas manifold 31A. As shown in FIG. 5, the manifold welding portion 41A surrounds the gas manifold 31A and prevents fluid communication with the temperature control medium flow passages 9 defined by the first and second separators 7A and 7C.

The cathode gas manifold 31C is in fluid communication with the cathode gas inlet 51 of the end plate 16. The gas manifold 31C distributes the cathode gas. Thus, a cathode gas is introduced from the cathode gas inlet 51 to the gas flow passages 8C that are provided in each cell 2.

In each separator assembly 30, a manifold welding portion 41C is provided so as to weld the first and second separators 7A and 7C around the cathode gas manifold 31C. As shown in FIG. 5, the manifold welding portion 42 surrounds the gas manifold 31C and prevents fluid communication with the temperature control medium flow passages 9 defined by the first and second separators 7A and 7C.

In each separator assembly 30, a peripheral welding portion 44 is provided so as to weld the first and second separators 7A and 7C along the peripheral portion.

Figure 6:
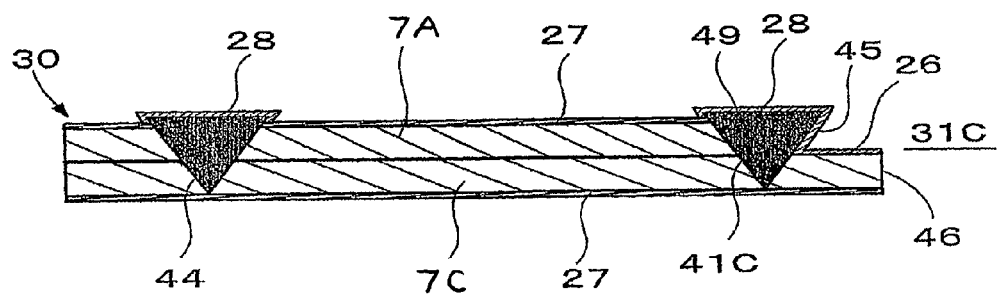
FIG. 6 is a cross-sectional view of a separator assembly taken along the line A-A shown in FIG. 5 and constructed in accordance with the exemplary embodiment illustrated in FIG. 1.

FIG. 6 is a cross-sectional view taken along the line A-A shown in FIG. 5. Thus, FIG. 6 shows the peripheral welding portion 44 and the manifold welding portion 41C in an area of the first and second separators 7A and 7C.

As shown in FIG. 6, the opening areas (areas where material has been removed, e.g., by a punching operation) of the manifold openings 45 and 46 of the first and second separators 7A and 7C for the cathode gas manifold 31C do not coincide with respect to one another. In particular, the manifold welding portion 41C is disposed at the manifold opening inner peripheral end 49 of the first separator 7A, which has a larger opening area than the second separator 7C.

The manifold openings 45 and 46 of the first and second separators 7A and 7C may be similarly formed, e.g., by punching, and may extend in parallel but are relatively sized such that their respective peripheral edges are spaced at a distance (e.g., approximately 1 millimeter) with respect to one another.

The manifold welding portion 41C serves to melt and join the manifold opening inner peripheral end 49 of the first separator 7A to the second separator 7C. Thus, whereas the manifold opening inner peripheral end 49 of the first separator 7A is not spaced from the manifold welding portion 41C, the manifold opening 46 of the second separator 7C is spaced from the manifold welding portion 41C by a desired distance.

Similarly, opening areas of the manifold openings 45 and 46 of the first and second separators 7A and 7C for the anode gas manifold 31A do not coincide with respect to one another. In particular, the manifold welding portion 41A is disposed at the manifold opening inner peripheral end 49 of the first separator 7A, which has a larger opening area than the second separator 7C.

After welding the first and second separators 7A and 7C, an anti-corrosive film 28 may be provided on the surfaces of each welding portion 10, 41A, 41C and 44, and on the peripheral portions thereabout. The anti-corrosive film 28 may be provided by, for example, plating.

The anti-corrosive film 28 provided on the surface of the welding portions 41A and 41C is disposed on the rear surface 26 of the second separator 7C, which extends adjacent to the welding portions 41A and 41C.

Alternatively, the anti-corrosive film 28 may be provided by a resin coating, by laser beam irradiation, or by other heating methods.

A method of manufacturing the separator assembly 30 will now be explained with reference to FIGS. 7a to 7c.

Figure 7:
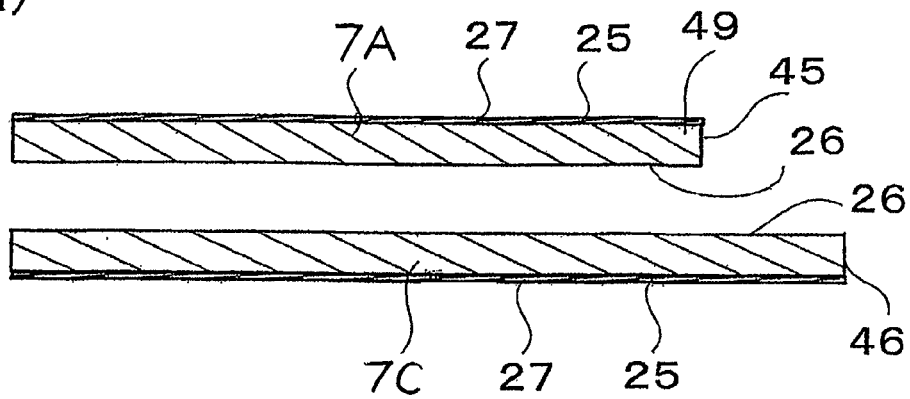
FIG. 7 is a cross-sectional view illustrating the manufacturing process of a separator assembly constructed in accordance with the exemplary embodiment illustrated in FIG. 1.
Figure 7:
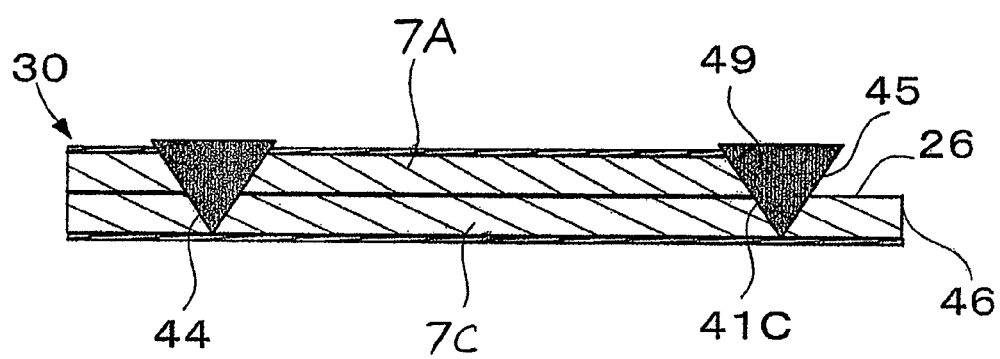
Figure 7:
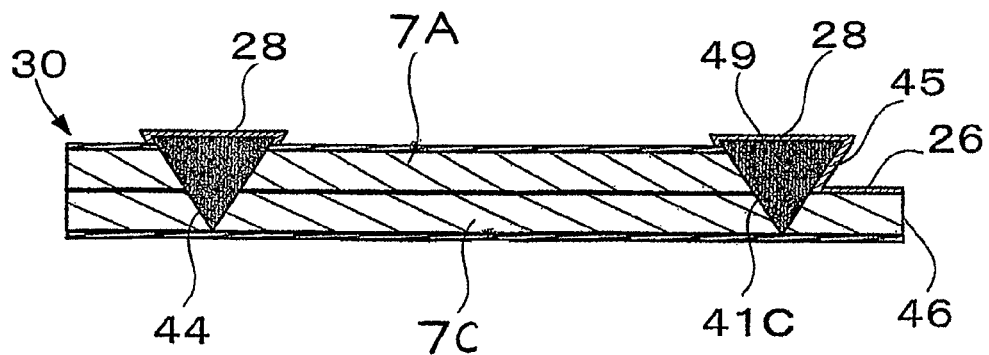

First, as shown in FIG. 7a, the first and second separators 7A and 7C, which may be formed by press-forming metal plates, include the anti-corrosive coating layer 27 provided on one side of the metal plate substrate. The anti-corrosive coating layer 27 may be provided after the metal plate substrate is press-formed.

Next, as shown in FIG. 7b, the first and second separators 7A and 7C are joined by the welding portions 41C and 44.

Then, as shown in FIG. 7c, the anti-corrosive film 28 is provided on the surfaces of the welding portions 41C and 44 and the peripheral portions thereabout.

Accordingly, a separator assembly 30 is provided with the first and second separators 7A and 7C joined to each other.

Some of the functions, effects, and advantages of exemplary embodiments of the present invention will now be explained.

The first and second separators 7A and 7C have reaction side surfaces 25 that face the electrolyte membrane electrode assembly 3 and are provided with an anti-corrosive property suitable for high temperature, high humidity, and acidic conditions. In particular, the anti-corrosive coating layer 27, which resists deterioration by oxidization, is provided on the reaction side surfaces 25. Thus, the substrate material, e.g., stainless steel, of the first and second separators 7A and 7C is provided with a sufficiently anti-corrosive property to protect the substrate material. The conductivity of each reaction side surface 25 is maintained through the anti-corrosive coating layer 27. Accordingly, the contact electric resistance of the first and second separators 7A and 7C and the electrolyte membrane electrode assembly 3 is maintained at a low state.

The anti-corrosive property at the welding portions 10, 41A, 41C and 44 may deteriorate due to the structural changes and residual stress that are caused by the heat of welding. Moreover, the heat of welding may also damage the anti-corrosive coating layer 27 on the reaction side surface 25 of the second separator 7C in the vicinity of at the welding portions 10, 41A, 41C and 44. Accordingly, the welding portions 10, 41A, 41C and 44 and the surrounding reaction side surface 25 may be heat treated to provide the anti-corrosive film 28 thereon. This reduces the deterioration of the anti-corrosive property due to the structural change and residual stress at the time of welding.

The rear surface 26 of the first and second separators 7A and 7C define the temperature control medium flow passages 9 also require an anti-corrosive property, which may be different, e.g., lower, than that of the reaction side surface 25. Accordingly, the anti-corrosive coating layer 27 may not necessarily be provided on each rear surface 26, thereby reducing the number of processes to provide the anti-corrosive coating layer 27, especially as compared to related structures in which an anti-corrosive coating layer is provided on both surfaces of first and second metal separator plates. At the same time, this also reduces the amount of materials, especially, precious metals, that are used in the anti-corrosive coating layer 27 and thereby decreases the cost of the fuel cells 2.

Although it may not be necessary or even desirable to provide the anti-corrosive coating layer 27 on each rear surface 26, the rear surface 26 is nevertheless exposed to the temperature control medium (e.g., a coolant), which may flow through the temperature control medium flow passage 9 during operation of the fuel cell 2. Accordingly, a surface layer oxide film may be deposited, e.g., by a passivation treatment, to increase the anti-corrosive property at the rear surfaces 26.

The surface layer oxide film disposed on the rear surfaces 26 may provide an insulating film. However, when the rear surfaces 26 of the first and second separators 7A and 7C for directly adjacent cells 2 are joined together by the welding portions 10, 41A, 41C and 44, electric resistance between the connected first and second separators 7A and 7C decreases and generating performance of the fuel cell stack 1 may be improved.

Further, the first and second separators 7A and 7C of the separator assembly 30 are integrally coupled at least by the welding portion 10. Accordingly, relative movement of the first and second separators 7A and 7C may be prevented and the number of parts of the fuel cell stack 1 may be reduced, thereby improving the assembly process.

In addition, opening areas of the manifold openings 45 and 46 of the first and second separators 7A and 7C facing the gas manifolds 31A and 31C do not coincide. Further, the manifold opening inner peripheral end 49 of the first separator 7A, which has a larger opening area, is welded to the second separator 7C to provide the manifold welding portions 41A and 41C. Accordingly, a gap between the first and second separators 7A and 7C may be eliminated in a portion between the manifold openings 45 and 46 and the manifold welding portions 41A and 41C. This prevents corrosion at that portion.

Figure 8:
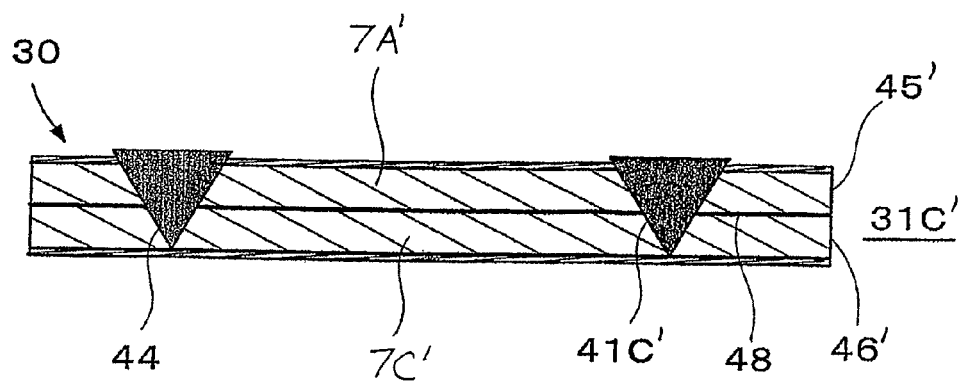
FIG. 8 is a cross-sectional view of a separator assembly constructed in accordance with a related device.

For comparison sake, FIG. 8 shows a related device in which manifold openings 45' and 46' of the first and second separators 7A' and 7C', e.g., which face the gas manifold 31C', coincide with each other. Further, the manifold welding portion 41C' is formed by inter-welding portions of the first and second separators 7A' and 7C' that are spaced from the manifold openings 45' and 46'. Thus, a gap 48 between the first and second separators 7A' and 7C' extends in a portion from the manifold openings 45' and 46' to the manifold welding portion 41C'. Thus, when halogen ions exist in the fluids flowing through the gas passages 8A and 8C, and there is a difference in the halogen ion concentration between the gap 48 and the gas manifolds 31C' (or 31A; not shown), then this becomes a concentration cell. Accordingly, a corrosive current may be generated at the gap 48, while the corrosion may be generated at the portions of the first and second separators 7A' and 7C' that define the gap 48.

However, in exemplary embodiments of the present invention, when the manifold welding portions 41A and 41C are provided, the manifold opening inner peripheral end 49 of the first separator 7A and the rear surface 26 of the second separator 7C are heated. Accordingly, the manifold opening inner peripheral end 49, which is melted by the welding, is fixed to the rear surface 26 of the second separator 7C to form the manifold welding portions 41A and 41C. This prevents a welding failure at the manifold welding portions 41A and 41C.

In the welding portions 10, 41A, 41C and 44, deterioration of the anti-corrosive property occurs due to the structural change and residual stress caused by the heat effect at the time of welding. Insofar as the anti-corrosive coating layer 27 may be damaged in the vicinity of the welding portions 10, 41A, 41C and 44, the anti-corrosive film 28 may be disposed on the surfaces of the welding portions 10, 41A, 41C and 44 and on the anti-corrosive coating layer 27 in the vicinity thereof to thereby prevent corrosion.

The rear surface 26 of the second separator 7C that extends adjacent to the welding portions 41A and 41C is exposed to the fluids flowing through the gas flow passages 8A and 8C. However, the anti-corrosive film 28 is disposed on the rear surface 26 to prevent corrosion of the rear surface 26.

First Alternate Exemplary Embodiment

Figure 9:
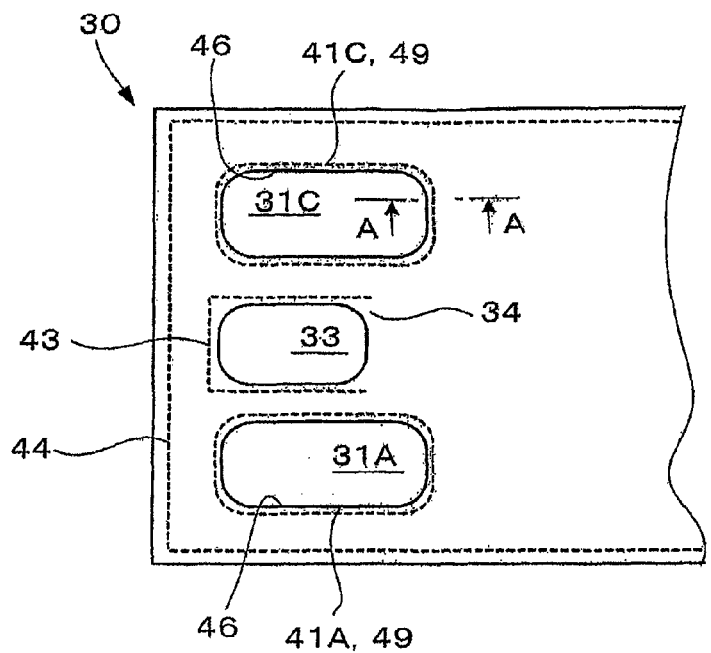
FIG. 9 is a plan view of a separator assembly constructed in accordance with a first alternate exemplary embodiment of the present invention.
Figure 10:
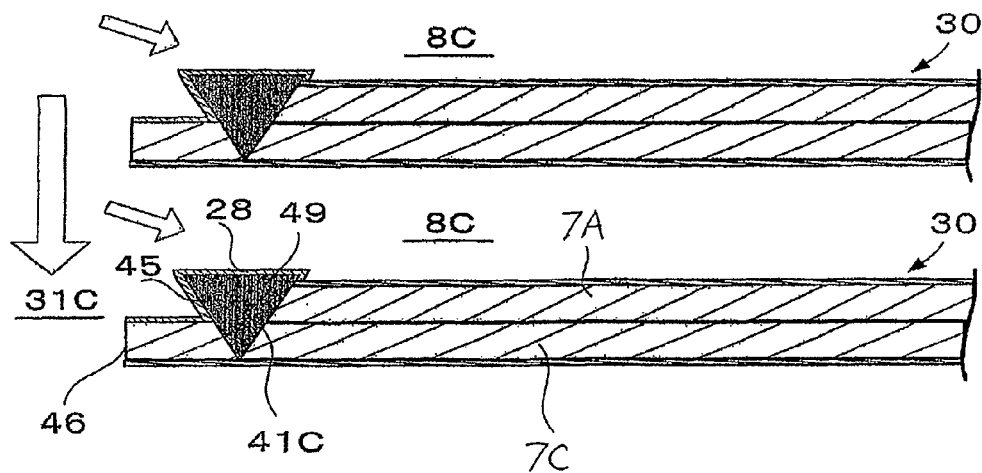
FIG. 10 is a cross-sectional view of a separator assembly taken along the line A-A shown in FIG. 9 and constructed in accordance with the first alternate exemplary embodiment of the present invention.

FIG. 10 is a cross-sectional view taken along the line A-A shown in FIG. 9, and shows a manifold welding portion 41C that is disposed at a portion of the first and second separators 7A and 7C shown in FIG. 10.

As indicated by the arrows shown in FIG. 10, the cathode gas flowing through the gas manifold 31C (single larger arrow) branches into the gas flow passage 8C (two smaller arrows) that are provided in each of two directly adjacent cells 2.

At the manifold openings 45 and 46 of the first and second separators 7A and 7C, an opening area of the manifold opening 45 of the first separator 7A, which is disposed upstream in the cathode gas flow in the gas manifold 31C, is larger than that of the manifold opening 46 of the second separator 7C, which is disposed downstream in the cathode gas flow. During manufacture, the manifold opening inner peripheral end 49 of the first separator 7A, which has a larger opening area, is heated and welded to the second separator 7C to form the welding portion 41C.

Similarly, the opening areas of the manifold openings 45 and 46 of the first and second separators 7A and 7C facing the gas manifold 31A also do not coincide. Further, the manifold opening 45 of the first separator 7A, which has a larger opening area, is disposed upstream in the anode gas flow.

Accordingly, the opening of the manifold opening 45, which is disposed upstream in the cathode gas flow, is provided with a larger area than that of the manifold opening 46, which is disposed downstream thereof. Accordingly, the flow of the cathode gas entered from the gas manifold 31C into the gas flow passage 8C becomes smooth. Further, the generating performance of the fuel cell stack 1 can be improved by increasing the amount of the cathode gas introduced into each cell 2.

Second Alternate Exemplary Embodiment

Figure 11:
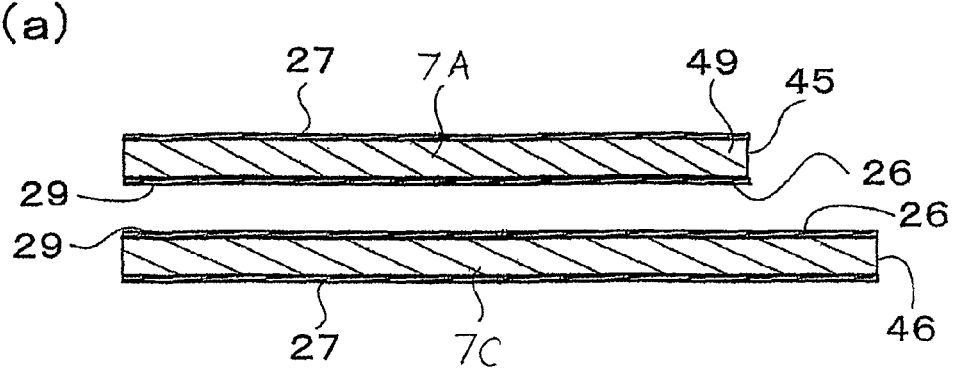
FIG. 11 is a cross-sectional view illustrating the manufacturing process of a separator assembly constructed in accordance with a second alternate exemplary embodiment of the present invention.
Figure 11:
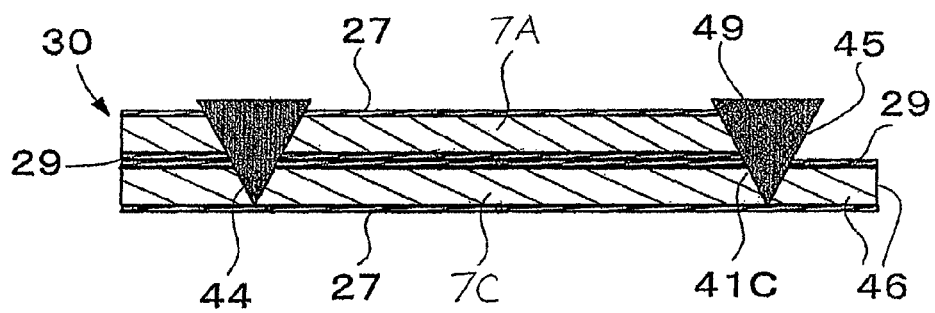
Figure 11:
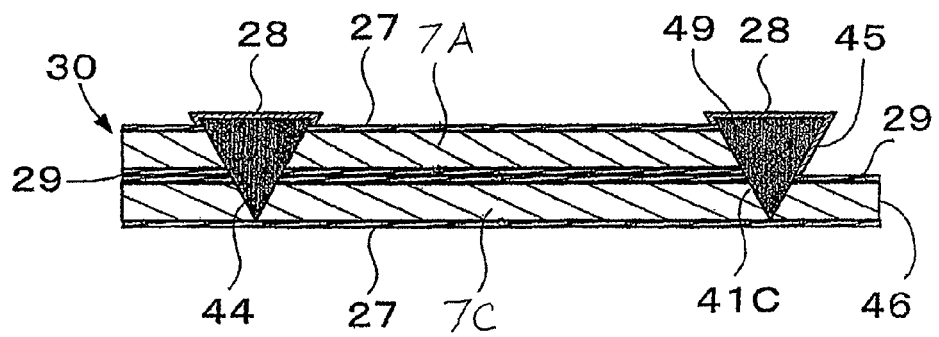

As shown in FIGS. 11(a) to 11(c), an anti-corrosive coating layer 29 may be formed on the rear surfaces 26 of the first and second separators 7A and 7C, i.e., that define the temperature control medium flow passages 9.

A process of manufacturing the separator assembly 30 shown in FIGS. 11a to 11c will now be explained.

First, as shown in FIG. 11(a), the first and second separators 7A and 7C are provided by, e.g., press-forming, a metal plate 32 on which respective anti-corrosive coating layers 27 and 29 are disposed on opposite surfaces of the substrate 31. Alternatively, the anti-corrosive coating layers 27 and 29 may be disposed on the substrate 31 after press-forming the substrate 31.

Next, as shown in FIG. 11(b), the first and second separators 7A and 7C are joined by the welding portions 41C and 44.

Then, as shown in FIG. 11(c), an anti-corrosive film 28 is disposed on the surfaces of the welding portions 41C and 44 and peripheral areas in the vicinity thereof.

Accordingly, the separator assembly 30 includes the first and second separators 7A and 7C joined to each other.

An anti-corrosive property of the rear surface 26 of the first and second separators 7A and 7C can be increased by the anti-corrosive coating layer 29. Further, a contact electric resistance between the first and second separators 7A and 7C can be effectively reduced if the anti-corrosive layer 29 includes, for example, a high-conductive plating layer.

Alternatively, depending on the anti-corrosive property required for the separator assembly 30, it may not be necessary to provide any one of the anti-corrosive coating layers 27 and 29 or the anti-corrosive film 28.

According to the second alternate exemplary embodiment of the present invention, the following functions, effects, and advantages may be achieved:

(I) The fuel cell stack 1 includes the gas manifolds 31A and 31C, and each fuel cell 2 is constructed by interposing the electrolyte membrane electrode assembly 3 between the first and second separators 7A and 7C. The electrolyte membrane electrode assembly 3 is constructed by interposing the electrolyte membrane 4 between a pair of electrode catalytic layers 5A and 5C, and the first and second separators 7A and 7C define the gas passages 8A and 8C on the respective sides of the electrode catalytic layers 5A and 5C. The gas manifolds 31A and 31C are in fluid communication with the gas flow passages 8A and 8C of a plurality of stacked cells 2. The fuel cell stack 1 may be characterized in that the manifold openings 45 and 46 that define the gas manifolds 31A and 31C are formed in the first and second separators 7A and 7C such that the opening areas of the manifold openings 45 and 46 of the first and second separators 7A and 7C do not coincide, and the manifold opening inner peripheral end 49 of the first separator 7A, which has a larger opening area, is welded to the second separator 7C at the manifold welding portion 41C. A gap between the first and second separators 7A and 7C is eliminated at a portion between the manifold openings 45 and 46 and the manifold welding portion 41C, thereby preventing the corrosion of the portion.

(II) The manifold welding portions 41A and 41C are provided by welding the manifold opening inner peripheral end 49 of the first separator 7A and the rear surface of the second separator 7C. Accordingly, the manifold opening inner peripheral end 49 is melted by the welding and is fixed to the rear surface 26 of the second separator 7C, thereby providing the manifold welding portions 41A and 41C. This prevents or at least avoids welding failures at the manifold welding portions 41A and 41C.

(III) The manifold openings 45 and 46 of the first and second separators 7A and 7C include the larger opening area of the manifold opening 45 of the first separator 7A disposed upstream in the cathode gas flow in the gas manifold 31A with respect to the manifold opening 46 of the second separator 7C, which is disposed downstream in the cathode gas flow. Accordingly, the flow of the cathode gas from the gas manifold 31C to the gas flow passage 8C becomes smooth. Further, the generating performance of the fuel cell stack 1 can be improved by increasing the amount of cathode gas introduced into each cell 2.

(IV) The rear surfaces 26 of the first and second separators 7A and 7C of respective directly adjacent fuel cells 2 are in contact with each other to define the flow passage 9 for distributing the temperature control medium. The anti-corrosive coating layer 27 is formed on the reaction side surface 25 facing the electrolyte membrane electrode assembly 3 of the first and second separators 7A and 7C, and the portions at which the rear surfaces 26 of the first and second separators 7A and 7C that are in contact with each other are welded at the welding portions 10, thereby ensuring the anti-corrosive property of the first and second separators 7A and 7C. At the same time, the processes that would be required to provide the anti-corrosive coating layer 27 on the rear surface 26 of the first and second separators 7A and 7c can be eliminated to decrease the cost of the product. Improved generating performance of the fuel cell can also be achieved by virtue of the welding portions 10 reducing the resistance between the rear surfaces 26.

(V) After welding the first and second separators 7A and 7C, the anti-corrosive film 28 is provided on at least the surfaces of the welding portions 10, 41A, 41C and 44. Accordingly, corrosion at and in the vicinity of the welding portions 10, 41A, 41C and 44 is prevented by the anti-corrosive film 28 even when the anti-corrosive coating layer 27 is damaged.

Although the exemplary embodiments described above show that the first separator 7A defines the gas flow passage 8A for guiding the anode gas, and the second separator 7C defines the gas flow passage 8C for guiding the cathode gas, the first and second separators 7A and 7C are not so limited. For example, either of the first and second separators 7A and 7C may define either of the gas flow passage 8A for guiding the anode gas or the gas flow passage 8C for guiding the cathode gas.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A method of manufacturing a fuel cell, comprising:
forming a first manifold opening in a metallic first separator disposed at a first side of an electrolyte membrane electrode assembly, the electrolyte membrane electrode assembly including electrode catalytic layers at both sides of an electrolyte membrane, and the first manifold opening defining a gas manifold distributing a gas along a stacked direction of the fuel cell;
forming a second manifold opening in a metallic second separator disposed at a second side of the electrolyte membrane electrode assembly, the second manifold opening having an opening area smaller than that of the first manifold opening, and the second manifold opening being in fluid communication with the first manifold opening; and
welding an inner peripheral edge of the first manifold opening to the second separator to form a manifold welding portion being disposed at the inner peripheral edge of the first manifold opening and disposed surrounding and being spaced from a peripheral edge of the second manifold opening.

2. The method of claim 1, wherein the welding comprises heating the inner peripheral end of the first manifold opening and a rear surface of the second separator.

3. The method of claim 1, further comprising:
disposing the first manifold upstream in a flow of the gas in the stacked direction; and
disposing the second manifold downstream in the flow of the gas in the stacked direction.

4. The method of claim 1, further comprising:
welding together contacting rear surface portions of the first and second separators;
forming an anti-corrosive coating layer only on a reaction side surface of the first and second separators, the reaction side surfaces facing the electrolyte membrane electrode assembly; and
distributing a temperature control medium in a flow passage defined by the joined rear surface portions of the first and second separators.

5. The method of claim 1, further comprising:
disposing an anti-corrosive film on the inner peripheral end of the first manifold and the welding to the second separator.

6. A fuel cell stack, comprising:
a first fuel cell including a first electrolyte membrane electrode assembly, the first electrolyte membrane electrode assembly including:
 a first anode catalytic layer;
 a first cathode catalytic layer; and
 a first electrode membrane disposed between the first anode and first cathode catalytic layers;
a second fuel cell including a second electrolyte membrane electrode assembly, the second electrolyte membrane electrode assembly including:
 a second anode catalytic layer;
 a second cathode catalytic layer; and
 a second electrode membrane disposed between the second anode and second cathode catalytic layers; and
a separator assembly disposed between the first and second fuel cells, the separator assembly including:
 a metallic first separator including a first gas flow passage supplying an anode gas to the first anode catalytic layer and including a first manifold opening of a gas manifold;
 a metallic second separator including a second gas flow passage supplying a cathode gas to the second cathode catalytic layer and including a second manifold opening of the gas manifold, the second manifold opening being differently sized with respect to the first manifold opening; and
 a manifold welding portion fixing together the first and second separators, the manifold welding portion being disposed at a peripheral edge of a larger of the first and second manifold openings and disposed surrounding and being spaced from a peripheral edge of a smaller of the first and second manifold openings.

7. The fuel cell stack of claim 6, further comprising:
a first gas diffusion layer contiguously disposed between the first anode catalytic layer and the first separator; and
a second gas diffusion layer contiguously disposed between the second cathode catalytic layer and the first separator.

8. The fuel cell stack of claim 6, wherein the manifold welding portion of the separator assembly is disposed between and separates the first and second gas flow passages.

9. The fuel cell stack of claim 6, wherein the larger of the first and second manifold openings is disposed upstream in a flow of the gas through the gas manifold, and wherein the smaller of the first and second manifold openings is disposed downstream in the flow of the gas through the gas manifold.

10. The fuel cell stack of claim 6, further comprising:
an anti-corrosive coating layer disposed only on reaction side surfaces of the first and second separators, the reaction side surfaces facing toward the first and second electrolyte membrane electrode assemblies, respectively.

11. The fuel cell stack of claim 6, wherein the separator assembly defines a cooling medium flow passage.

12. The fuel cell stack of claim 6, wherein rear side surfaces of the first and second separators mutually define a cooling medium flow passage.

13. The fuel cell stack of claim 12, wherein the manifold welding portion fixes the peripheral edge of the larger of the first and second manifold openings to the rear surface of the first or second separator that includes the smaller of the first and second manifold openings.

14. The fuel cell of claim 6, wherein an anti-corrosive film is disposed on a surface of the manifold welding portion.

* * * * *